Patented June 14, 1927.

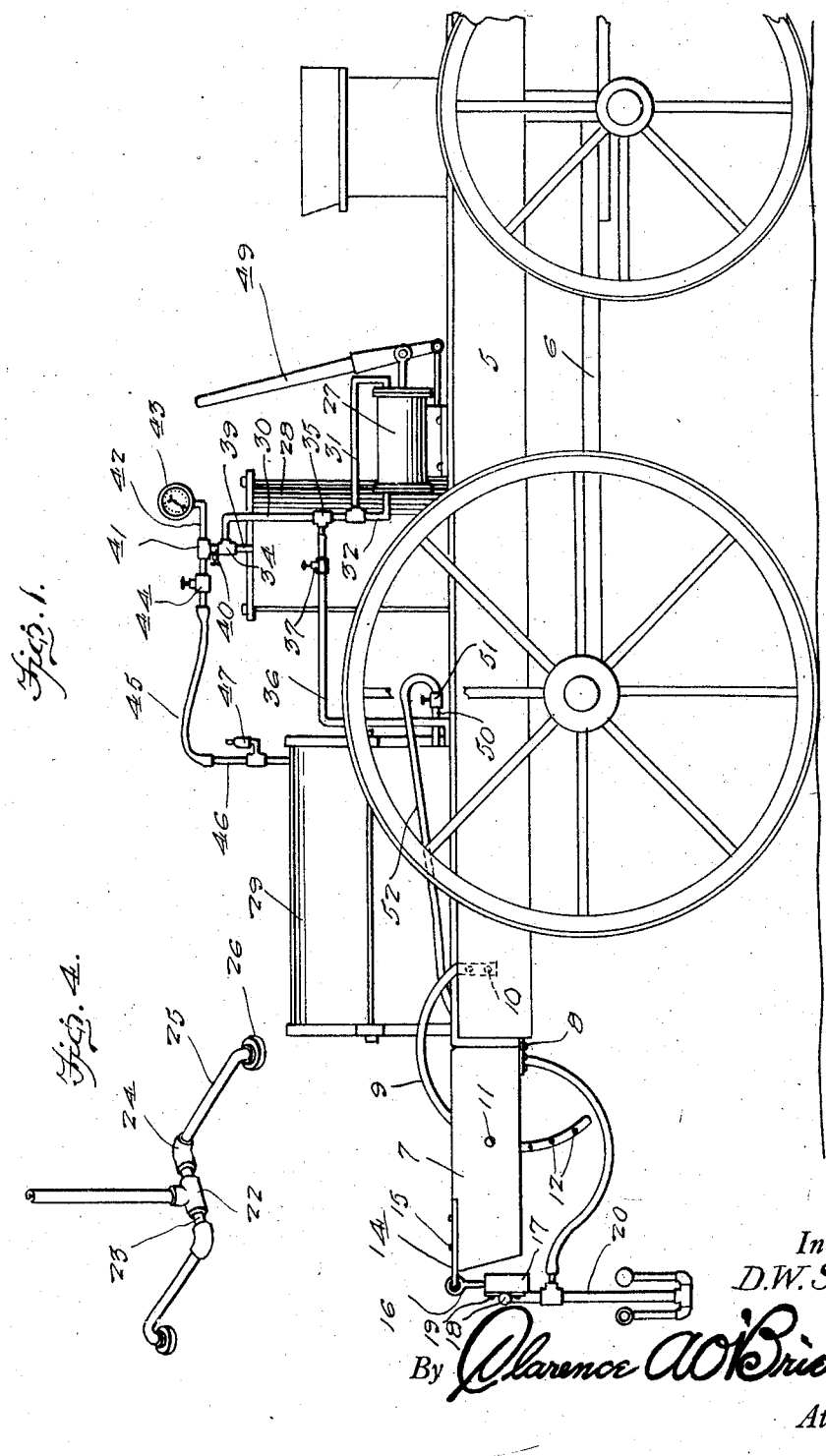

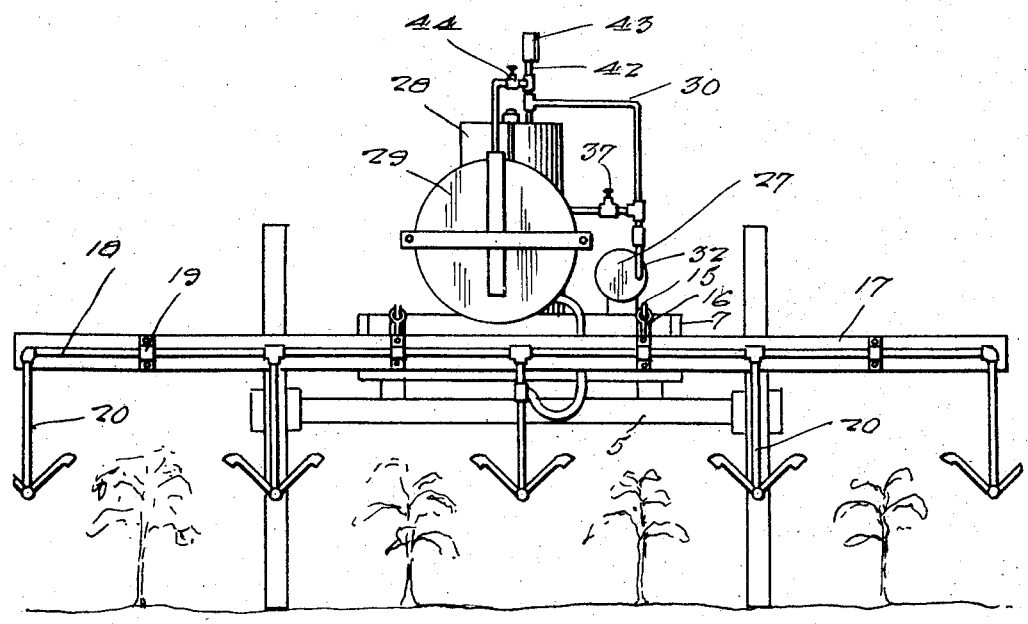
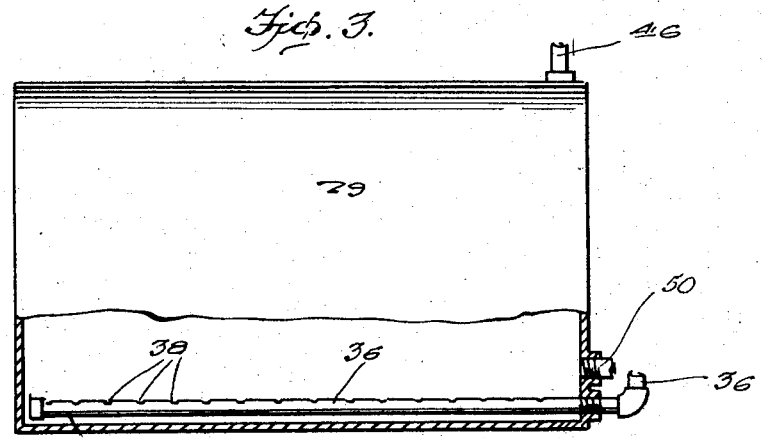

1,632,047

UNITED STATES PATENT OFFICE.

DANIEL W. SMITH, OF MALONE, TEXAS.

SPRAYING MACHINE.

Application filed April 28, 1926. Serial No. 105,238.

The present invention relates to a spraying machine.

An important object of this invention resides in the provision of a wheeled frame having an auxiliary frame hingedly mounted thereon with means for holding said auxiliary frame in different adjusted positions and means for mounting a spray nozzle or nozzles on the auxiliary frame whereby a nozzle and efficient combination of elements is produced.

With the above and numerous other objects in view as will appear as the description proceeds, the invention resides in certain novel features of construction, and in the combination and arrangement of parts as will be hereinafter more fully described and claimed.

In the drawings:—

Figure 1 is a side elevation of the machine embodying the features of my invention, Figure 2 is a rear elevation thereof, Figure 3 is a sectional elevation of the insecticide tank, and Figure 4 is a perspective view of one of the spraying devices.

Referring to the drawing in detail it will be seen that 5 designates a main frame mounted in any suitable manner on a wheeled carriage 6 of any desired form. An auxiliary frame section 7 is hinged to the rear end of the main frame 5 as at 8. An arcuate bar 9 is attached to the main frame 5 as at 9, and is disposed concentrically to the axis of the hinge 8 so that a pin 11 may pierce an opening provided in the auxiliary main section 7, and one of a plurality of openings provided in the bar 9 whereby the auxiliary frame section 7 may be held in different angular positions in relation to the main frame 5. A plurality of bars 14 are fixed as at 15 to the auxiliary frame section 7 and extend rearwardly therefrom and are engaged by eye bolts 16 for supporting a beam 17 on which is mounted to extend longitudinally therewith a pipe 18 held in place by brackets 19. A plurality of pipe sections 20 depend from the pipe 18 and have mounted on their bottom ends a T-coupling 22 having sections 23 extending therefrom for receiving the L-couplings 24. Pipes 25 extend from the L-couplings and terminate into spray nozzles 26. It will thus be seen that the pipe 25 may be swung to different angular positions in relation to the pipe section because of the elbow couplings 24.

On the main frame 5 there is mounted a double acting pump 27, an air tank 28, and a solution or insecticide tank 29 preferably in the order mentioned. A pipe 30 having branches 31 and 32 leading from the double acting pump 27 has couplings 34 and 35 therein. A pipe 36 leads from the coupling 35 and has a valve 37 therein. This pipe 36 extends longitudinally through the bottom of the tank 29 as is clearly shown in Figure 3, and the portion within the tank is provided with a plurality of apertures 38 so that the air may be forced into the solution or insecticide within the tank 29 for the purpose of properly agitating the same. A pipe 39 leads from the coupling 34 into the tank 29. A valve 40 is associated with the coupling 34 and a coupling 41 in a pipe 42 which has a gage 43 at one end. A valve 44 is provided in the pipe 42 adjacent the other end thereof. Said other end of the pipe 42 has a hose 45 leading therefrom to a pipe 46 rising from the tank 29 and having a blow off valve 47 associated therewith. It will thus be seen that by having the valve 44 closed and the valve 40 opened, the gage 43 will indicate the pressure in the tank 28. However, if the valve 40 is closed and the valve 44 is opened, this gage 43 will indicate the pressure in the tank 29. The double acting pump 27 may be operated in any suitable manner such as by a lever 49.

A pipe 50 leads from the tank 29 and has a valve 51 therein. This pipe 50 is connected to a flexible hose 52 which leads to the center pipe 20.

The pressure in the tank 28 is obtained through the operation of the double acting pump 27 as is apparent. When it is desired to use this air pressure, the valve 37 may be opened. The spray nozzles and pipe 25 may be disposed at the desired angle, and in the case of very small plants they may be disposed so as to incline downwardly instead of upwardly as they are shown in Figure 2 so that a gravity feed will be sufficient. However, in the case of larger plants it is preferable to use the air pressure accumulated in the tank 28. This air pressure, of course, also greatly assists in maintaining the solution of the insecticide in the tank 29 properly stirred up so as to prevent sediment. The adjustment which is possible through the hinge connection 8 and the arcuate bar 9 is very important in adjusting the machine to different size plants.

It is thought that the construction, operation, and advantages of this invention will now be apparent to those skilled in this art without a more detailed description thereof. The present embodiment of the invention has been disclosed merely by way of example since in actual practice it attains the features of advantage enumerated as desirable in the statement of the invention and the above description. It is apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:—

In combination, a vehicle, a main frame on the vehicle, an auxiliary frame, hinges attached to the under surface of the main frame and the under surface of the auxiliary frame section so that the hinged edges will abut when the auxiliary frame section is in the same plane with the main section and so that said auxiliary frame section may be held at different angles in respect to the main frame so as to incline rearwardly and downwardly therefrom, an arcuate bar attached to the main frame and disposed concentrically about the axis of the hinges, a pin piercing an opening in the auxiliary frame section and adapted to pierce one of a plurality of openings provided in the bar, brackets projecting rearwardly from the auxiliary frame section, eye-bolts hingedly engaged with said brackets, a beam supported on the eye-bolts, and spraying means on the beam.

In testimony whereof I affix my signature.

DANIEL W. SMITH.